United States Patent [19]

Sovis et al.

[11] Patent Number: 4,731,898
[45] Date of Patent: Mar. 22, 1988

[54] BRUSH SPEED INDICATOR

[75] Inventors: John F. Sovis, Richmond Heights; Michael F. Wright, Cuyahoga Falls; Scott B. Richards, Wadsworth; Abe Zeeway, Cleveland, all of Ohio

[73] Assignee: Royal Appliance Mfg. Co., Cleveland, Ohio

[21] Appl. No.: 908,352

[22] Filed: Sep. 5, 1986
(Under 37 CFR 1.47)

[51] Int. Cl.⁴ ............................ A47L 9/28; H02H 7/08
[52] U.S. Cl. .......................................... 15/339; 361/23
[58] Field of Search ....................... 15/319, 339; 361/23

[56] References Cited

U.S. PATENT DOCUMENTS

| | | | |
|---|---|---|---|
| 4,163,999 | 8/1979 | Eaton et al. | 361/23 |
| 4,245,370 | 1/1981 | Baker | 15/319 |
| 4,328,522 | 5/1982 | Tryan | 15/319 X |
| 4,370,690 | 1/1983 | Baker | 15/319 X |
| 4,398,231 | 8/1983 | Currence | 361/23 |
| 4,637,092 | 1/1987 | Hayashi et al. | 15/319 |
| 4,654,924 | 4/1987 | Getz et al. | 15/319 |

Primary Examiner—Chris K. Moore
Attorney, Agent, or Firm—Fay, Sharpe, Beall, Fagan, Minnich & McKee

[57] ABSTRACT

An electric vacuum cleaner includes a rotating brush driven by an elastomeric belt coupled to a motor spaced from the brush. Jamming of the brush bearings, wear of the belt, separation of the belt from the drive shaft, or breaking of the belt hinders or prevents rotation of the brush. A brush speed indicator provides a first signal rerpesentative of the rotational movement of the brush and a second means is adapted to receive the first signal and generate a second signal in response thereto. The second signal is preferably an electrical current and is transmitted to power an indicator such as an LED. The brush speed indicator also is used to sense motor performance by diagnosing motor drop-off.

4 Claims, 6 Drawing Figures

BRUSH SPEED INDICATOR

BACKGROUND OF THE INVENTION

This invention pertains to the art of detecting means and more particularly to means for detecting whether a member is rotating relative to a fixed position. The invention is particularly applicable to an electric vacuum cleaner employing a rotating beater brush and will be described with particular reference thereto. However, it will be appreciated that the invention has broader applications and may be advantageously employed in other environments and applications.

Typically, a rotating beater brush is employed in an electric vacuum cleaner for agitating the floor surface and assisting in removal of soil and dirt therefrom. An electric motor is supplied with a source of alternating current, such as obtained through a conventional household electrical outlet. Rotary motion of the motor is advantageously used to create a vacuum effect at a nozzle area. Additionally, an elastomeric belt extends from the main motor to drive the brush. The beater brush includes radially outward extending bristles that mechanically sweep the floor surface and assist in loosening dirt and debris. Therefore, the floor surface is cleaned through use of the vacuum or suction action in combination with the mechanical action of the brush.

Actuation of the motor normally signifies that the brush is also rotating. Occasionally, though, the brush fails to rotate even though the motor is operating. For example, the belt will fail either by jamming of the brush bearings with dirt, by wear of the belt, by separation from the motor driveshaft, or by simply breaking. In such cases, the operator of the vacuum cleaner may not be aware that the brush fails to rotate, or that it is rotating at insufficient speed, since there is no readily visible indicator or detector means.

U.S. Pat. No. 4,392,271 issued to Sepke July 12, 1983, is directed to one potential solution to the above-identified problem. More specifically, Sepke contemplates use of a transparent window mounted in an upper portion of a nozzle housing. The window is aligned with an elastomeric drive belt to enable an operator to visually determine the condition of the belt. The outwardly facing surface of the belt is provided with light colored markings which are readily contrasted with the dark color of the remainder of the belt. These markings are such that alternate regions of the markings and the belt will be visible so that movement is readily detectable.

One apparent problem with this structure resides in the environment and use of the vacuum cleaner. Dirt and debris can cloud the transparent window after extended use. Further, although rotational and stationary conditions of the belt can be easily detected, there is no means to distinguish between predetermined rotational speeds of the belt in an accurate manner. Slippage or wear of the belt may not be apparent until the brush is rotating at an extremely slow speed or not at all.

It has, therefore, been considered desirable to provide a new detecting means that is not subject to the above identified problems and yet offers all the same benefits. It has also been considered desirable to provide a means for readily detecting predetermined rotational speeds of the beater brush. The subject invention is deemed to meet these needs and others in a simplified and economical manner.

SUMMARY OF THE INVENTION

According to the present invention, there is provided a brush speed indicator accommodated in a conventional vacuum cleaner.

According to a more limited aspect of the invention, the vacuum cleaner includes a nozzle housing having a rotary brush operatively received therein. The brush is connected to rotating means such as a motor. Means for providing a first signal indicative of the rotary motion of the brush is utilized.

According to another aspect of the invention, means for receiving the first signal and generating a second signal in response thereto is provided.

According to another aspect of the invention, the first signal providing means includes a permanent magnet operatively disposed on the brush periphery.

According to yet another aspect of the invention, the means for receiving the first signal and generating another signal includes a coil mounted on the nozzle housing at an area adjacent the rotational path of the magnet whereby rotary motion of the brush induces current flow in the coil.

According to a further aspect of the invention, an indicating means includes a light actuated by the second signal.

According to a more detailed aspect of the invention, the magnet may be formed as an annular ring having arcuate portions of alternating opposite poles.

According to yet another aspect of the invention, the current impulses produced by the magnet and coil are integrated in a circuit for charging a capacitor and maintaining the indicating means in an actuated state.

According to a still further aspect of the invention, the magnet is fixedly mounted on the nozzle housing and metal, such as iron, is fitted on the rotating brush to vary the magnetic flux and induce current flow in the coil.

The principal advantage of the invention resides in the simplified structure for detecting rotation of the beater brush.

Yet another advantage resides in the positive visual indication of the rotational movement of the brush.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein.

DETAILED DESCRIPTION OF THE PREFERRED AND ALTERNATE EMBODIMENTS

Figure 1:
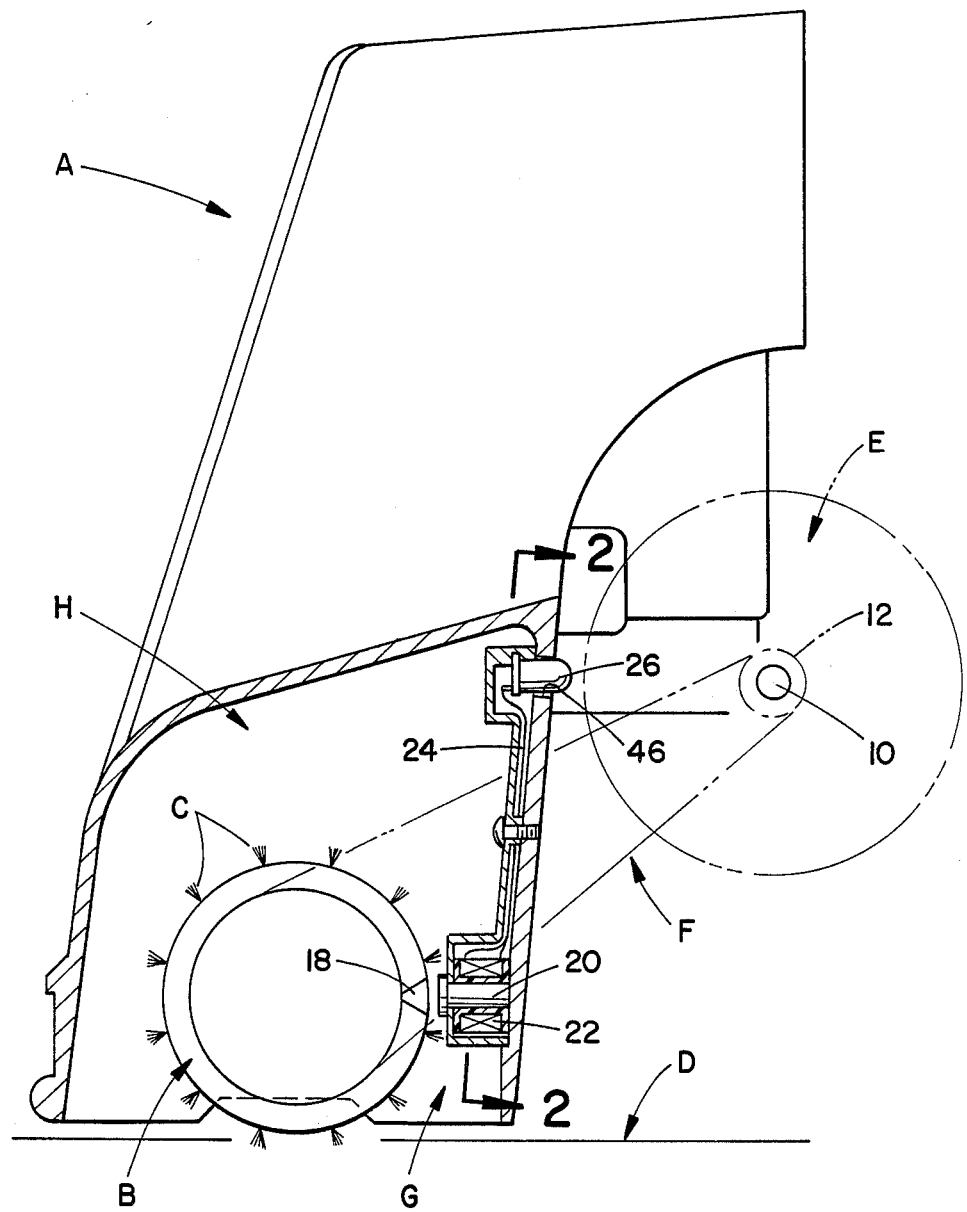
FIG. 1 is a side elevational view of a vacuum cleaner nozzle housing in partial cross-section for ease of viewing component parts thereof.

Referring now to the drawings wherein the showings are for purposes of illustrating the preferred and alternate embodiments of the invention only and not for purposes of limiting same, the FIGURES show a nozzle housing A of a vacuum cleaner of the type typically found in an upright electric vacuum cleaner. A beater brush B is received in the nozzle housing A and designed for rotary motion with respect thereto. Bristles C are radially positioned in a preselected manner along the peripheral portion of the brush and adapted for sweeping mechanical contact with a floor surface D such as a rug, carpet, or the like. An electrical motor E is associated with the nozzle housing and is operatively associated with an elastomeric belt F to transmit rotary motion of the motor to the brush B for its sweeping action. The discussion to this point describes a conventional upright electric vacuum cleaner that employs a rotating beater brush therein.

With reference to FIG. 1, a brush speed indicator G is adapted to the above-described conventional upright vacuum cleaner for detecting rotational movement of the brush B relative to the housing. More specifically, the housing A is constructed of metal, plastic, or the like and extends upwardly from a supported position adjacent the floor surface. The interior of the housing defines a suction passageway H to remove dirt and debris from the floor surface. The motor E is of heavy-duty construction and is supplied with alternating current through a conventional on-off switch (not shown).

A drive shaft 12 extends from the motor and includes either a groove or crown surface designed to receive elastomeric belt F thereon. The belt extends in a closed loop driving relation from the shaft 12 to a similar groove or crown surface 14 defined on the brush B. In this manner, rotational movement of the shaft imparts driving motion to the closed loop path of the belt F which, in turn, rotationally drives the brush B for mechanical sweeping action of the floor surface D.

Figure 2:
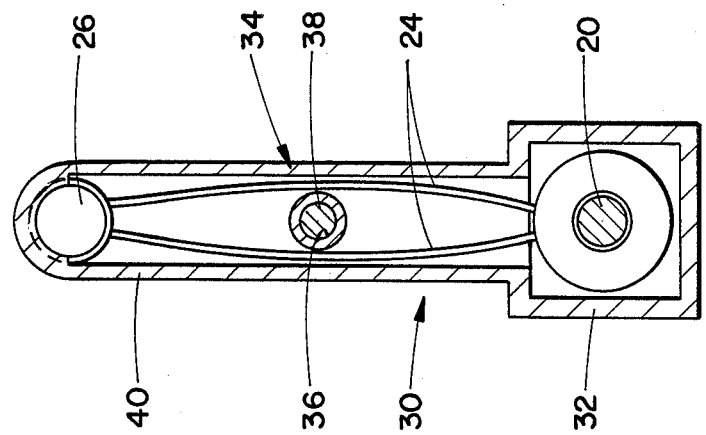
FIG. 2 is a cross-sectional view of the coil and indicator light housing of FIG. 1 taken generally along the lines 2—2 thereof.

In the most preferred embodiment of the invention, as illustrated in FIGS. 1 and 2, the brush speed indicator G includes a permanent magnet 18 that is fixedly secured to a peripheral portion of the brush. An adhesive or mounting inset formed in the body of the brush securely fastens the permanent magnet for rotation with the brush B.

As is well known, a permanent magnet defines a magnetic field represented by lines of induction extending between the north and south poles. In a broad sense of the term, a signal is defined by the magnetic field of the magnet. If the magnet is moved relative to a magnetic pick-up 20 and coil 22, a current is set up or induced in the coil and is generally referred to as an induced current. The magnetic pick-up and coil can be more generally defined as a signal receiving means as well as a means for generating a second signal, i.e., the induced current. In the FIG. 1 embodiment, the magnetic pick-up 20 is comprised of a metallic member centrally disposed in the coil 22. This arrangement confines the changing magnetic flux to a definite path. As is known, the permeability of ferromagnetic materials is greater than that for free space and the flux density produced by the magnetic field intensity is increased through use of ferromagnetic materials. The current produced in coil 22 is conveyed through electrical lead lines 24 to respective terminals of a conventional light emitting diode (LED). Therefore, continued rotation of the brush, and the permanent magnet attached thereto establishes current flow to actuate the LED 26 and provide a positive, visual indication of brush rotation.

A brush speed indicator housing 30 (FIG. 2) may be formed from plastic or similar material that will not interfere with the flux or magnetic fields and current flow established by the above-noted process. With continued reference to FIG. 1, and additional reference to FIG. 2, the indicator housing 30 includes a first or lower end 32 adapted to closely receive the magnetic pick-up 20 and coil 22 therein. The coil can be completely received in the indicator housing where it is preferably protected from debris or dirt directed through the nozzle housing A. The electrical lead lines 24 extend through an intermediate portion 34 of the indicator housing. The intermediate housing portion includes a mounting aperture 36 that closely receives fastening means 38, such as a screw or other conventional fastener. The fastening means 38 securely positions the indicator housing to the nozzle housing. A second or upper end 40 of the indicator housing is designed to retainingly receive the LED 26. Preferably, and as illustrated in FIG. 1, the LED extends through an aperture 46 formed in the rear wall of the nozzle housing where it may be readily observed by a vacuum cleaner operator. Of course, other mounting arrangements and positions of the LED may be used without departing from the scope and intent of the subject invention.

The fastener 38 fixedly secures the indicator housing 30 to a rear wall of the nozzle housing so that the magnetic pick-up 20 and the coil 22 are advantageously positioned at an area between the beater brush B and the nozzle housing adjacent the rotational path of the magnet 18. Upon rotation of the brush, the permanent magnet 18 rotates toward and away from the magnetic pick-up 20 and the coil 22 in completing one revolution of the brush. As described above, the relative motion between the permanent magnet and the coil induces an electrical current in the coil which is transmitted to the LED for indicia purposes.

As described above, the magnetic pick-up and coil are mounted adjacent the rotational path of the magnet and positioning of these components in the nozzle housing may vary. For example, the magnetic pick-up and coil may be mounted at an acute angle relative to a horizontal plane defined through the beater brush axis of rotation. The magnetic pick-up and coil can thereby be axially elongated due to the housing configuration. A longer, thinner coil is generally equivalent to a shorter, thicker coil in performance but a thinner coil will limit potential interference with the bristles C and bearing assembly to be described further hereinbelow.

If the elastomeric belt F breaks, the motor drive shaft 10 may continue to turn and adequate suction is still provided to the nozzle housing. An operator of the vacuum cleaner lacking the subject invention will only indirectly discover that the brush is not rotating. That is, there might be a slight change in the operating sound of the vacuum cleaner or a reduced amount of soil pick-up may become apparent. These indirect indicia may not be readily noticed whereas utilization of the subject invention provides a positive, visual signal to the vacuum cleaner operator.

Other problems associated with the elastomeric belt may result from dirt and debris fouling the brush bearings and preventing rotation thereof. The elastomeric belt F may also become separated from either the drive pulley 12 or the driven pulley 14 so that rotation is either hampered or completely prevented. Yet another problem results from wear of the belt and slippage between the belt and one of the pulleys. This, in turn, reduces the efficiency of the rotational output either partially or completely. If the brush fails to rotate at a sufficient speed, an insufficient current is induced in the coil and, of course, insufficient current is transmitted to the LED. The LED either will not glow brightly, will exhibit an inconsistent flickering, or will not glow at all, depending on which type of problem is encountered. An operator is readily made aware that any one of the above conditions may exist through incorporation of the brush speed indicator G. Even though the motor continues to provide a rotational drive output and adequate suction to the nozzle housing, the vacuum cleaner is not operating in the most efficient mode if the LED is not glowing brightly.

Figure 3A:
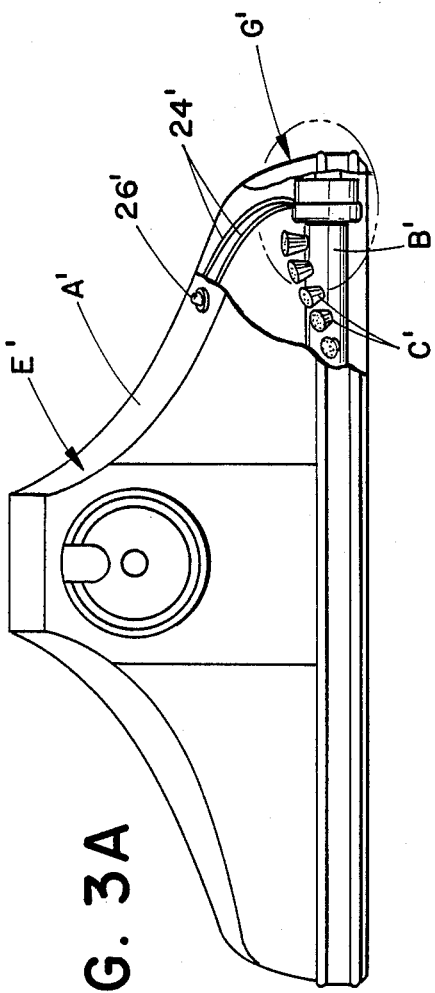
FIG. 3A is a front elevational view of an alternative vacuum cleaner nozzle housing with selected portions cut away for ease of illustration.
Figure 3B:
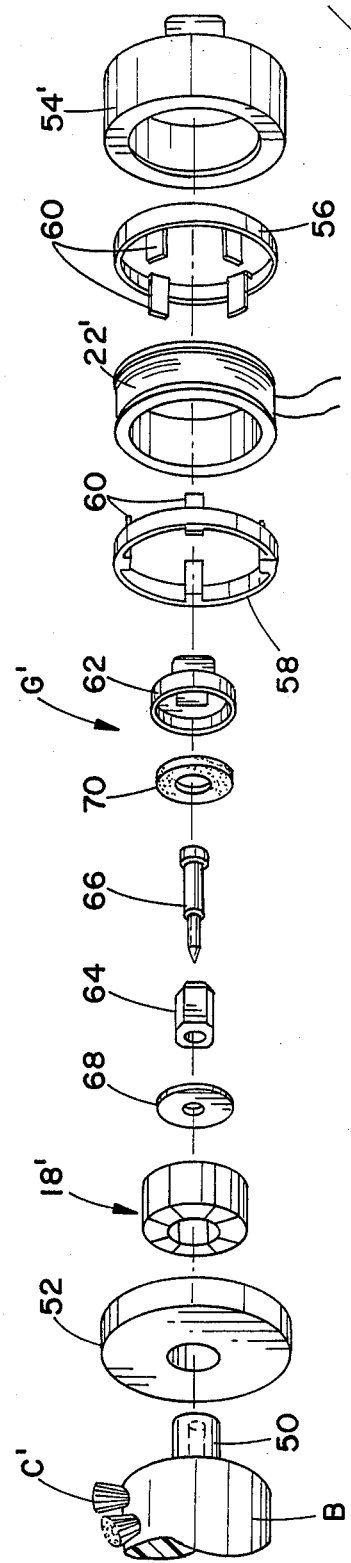
FIG. 3B is an exploded perspective view of the alternative embodiment of FIG. 3A employing a brush indicator means using an annular magnet having arcuate portions of alternating opposite polarity.

A first alternate embodiment is illustrated in FIGS. 3A and 3B. For ease of illustration, like elements are identified by like numerals with a primed (') suffix and new elements are identified by new numerals. The nozzle housing A' receives brush B' having a radially outward disposed bristles C' for rotational sweeping movement therein. An electrical motor provides the drive power for an elastomeric belt (not shown) which rotates the brush.

The brush speed indicator G' is situated at one end of the brush and designed to provide positive visual indication of its rotational movement. More specifically, permanent magnet 18' is of annular shape and includes circumferentially spaced, pie-shaped portions of alternating magnetic poles. As illustrated in this alternate embodiment, the annular magnet is formed of eight distinct pie-shaped portions that are integrally fastened together. It will be readily apparent that other numbers and arrangements of alternating magnetic pole portions can be used without departing from the spirit and scope of the subject invention. The magnet 18' is received over a reduced diameter axial extension 50 of the brush B'. A spacer 52 is received between the brush and magnet. A protector cap 54 is fixedly attached to the nozzle housing and receives a pair of opposed pole pieces 56, 58 that retain coil 22' therebetween. The pole pieces are of annular shape and include axially directed flanges 60 disposed along the inner circumferential area of the pole pieces. The flanges, as well as the remainder of the pole pieces, direct and concentrate the changing magnetic flux in much the same manner as the magnetic pick-up in the FIG. 1 embodiment. This assures induction of electrical current in the coil 22'.

A bearing holder 62 is concentrically received in the protector cap 54 and positioned radially inward from the coil structure. The bearing holder, in turn, receives bearing member 64 which is mounted by pin 66 to the axial extension 50 of the brush. A thrust washer 68, and felt oil reservoir 70 are also interposed between the bearing and the brush. The felt oil reservoir provides lubrication for the bearing and prevents oil from leaving the system. Thus, the magnet and spacer 52 rotate with the brush B' while the bearing assembly, pole pieces, and coil remain stationary with respect to the nozzle housing.

As described in detail above, the change in magnetic flux induces a current in the coil which is transmitted through electrical lead lines 24' to the LED 26'. Due to the plural, circumferentially spaced, alternating magnetic poles, the magnetic flux changes more quickly thereby supplying more frequent electrical impulses to the LED.

A second alternative embodiment is particularly directed to an electrical circuit that may be used in conjunction with either the preferred embodiment of FIGS. 1 and 2 or the alternate embodiment of FIG. 3. For ease of illustration, like elements are identified by like numerals with a double primed (") suffix and new elements are identified by new numerals.

Figure 4:
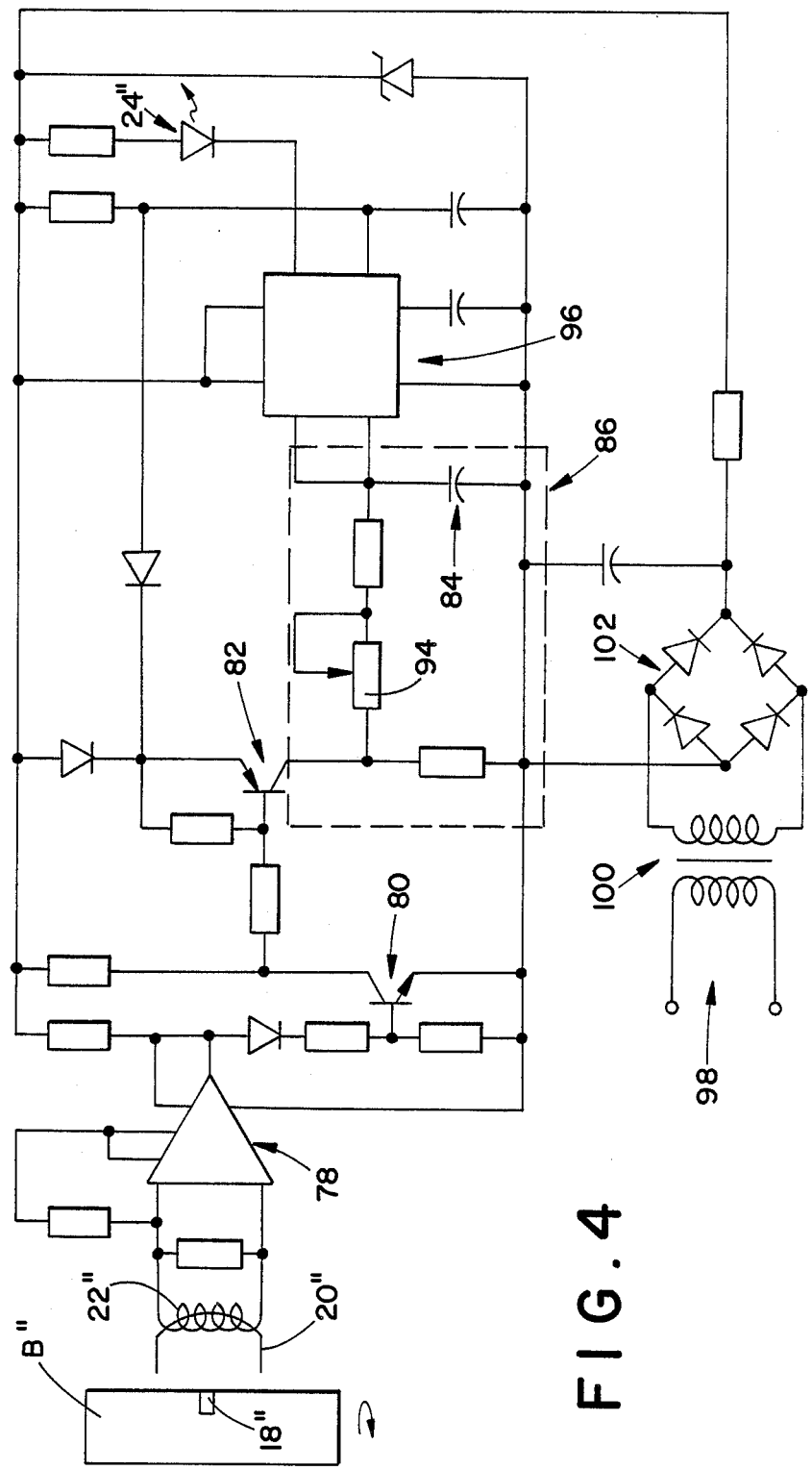
FIG. 4 is a schematic diagram of an electrical circuit in accordance with another alternative embodiment of the present invention; and, FIG. 5 is a schematic representation of yet another alternative embodiment wherein the magnet is fixedly mounted with respect to the nozzle housing.

FIG. 4 illustrates schematically a rotating brush B" on which a permanent magnet 18" is fixedly disposed. As described above, the magnet can be a single element as in the FIG. 1 embodiment or be comprised of multiple magnets of alternating poles as in the FIG. 3B embodiment. A magnetic pick-up 20" and coil assembly 22" are fixedly mounted to the nozzle housing. The electrical current impulses created by the rotating magnet and stationary coil structure are received and amplified by operational amplifier 78. The amplifier, in turn, provides a pair of signals which are received by complimentary PNP and NPN transistors 80, 82, respectively. The signals are further amplified and transmitted to a time constant circuit represented by the box 86. The capacitor 84 is charged in a gradual, step-wise manner that is dependent on the rotational frequency of the brush and magnet. If the brush is rotating at a predetermined desired speed, the capacitor 84 will become charged. If not, then the capacitor will fail to charge, or may gradually discharge if brush speed drops below the desired value after initial capacitor charging.

Variable resistor 94 can be altered to control the rate at which the capacitor 84 is charged. By varying the resistor 94, different rotational speeds of the brush B" may be selected to charge the capacitor. In this manner different brush speeds can be distinguished through the use of the same circuit. Once the capacitor has charged sufficiently to trigger timer 96, an output is provided to the LED 24". If no impulse is provided, such as when the brush fails to rotate, the timer will swithch off and the LED will fail to be activated and thereby indicate that some problem exists with the brush. The circuit provides a distinct on-off control of the LED and, through selection of the resistor values, the LED can be designed for actuation at different rotational speeds of the brush fails to rotate, the timer will switch off and different colored or positioned diodes for alternately indicating no brush rotation or just unacceptably slow brush rotation.

The main power supply 98 for the remainder of the vacuum cleaner, such as a 115 volt line, can be transformed to a lower voltage level through transformer 100 and bridge network 102 to also provide power to the circuit. Further discussion of the circuit is deemed unnecessary to a complete understanding of the invention. One of ordinary skill in the art will readily recognize the ability to alter the actuation of the LED at different rotational speeds of the brush. In one operationally successful embodiment of the control circuit the following elemental values were employed:

| Quantity | Item | |
|---|---|---|
| 1 | LOW VOLTAGE OP-AMP: | LM10CLH |
| 1 | TOMER INT. CIR.: | UA555TC |
| 1 | NPN TRANSISTOR: | 2N3904 |
| 1 | PNP TRANSISTOR: | 2N3906 |
| 1 | RECTIFIER BRIDGE 50 V/1 A: | VM08 |
| 1 | ZENER DIODE 5.1 V/1 W: | IN4733 |
| 1 | CAPACITOR 470 MF/25 V: | ECEA 1EV4715 |
| 1 | CAPACITOR 2.2 MF/25 V: | T368B225M025AS |
| 1 | CAPACITOR .1 MF/50 V: | CY20C104M |
| 1 | CAPACITOR .022 MF/50 V: | CW20C223K |
| 1 | SIGNAL DIODE: | 1N4148 |
| 1 | LED: | 521-9240 |
| 12 | RESISTORS: | 5%/1/4 W |
| 1 | MAGNETIC PICK-UP: | |
| 1 | PERMANENT MAGNET: | |
| 1 | POWER TRANSFORMER: | PC-12-70 |

Figure 5:
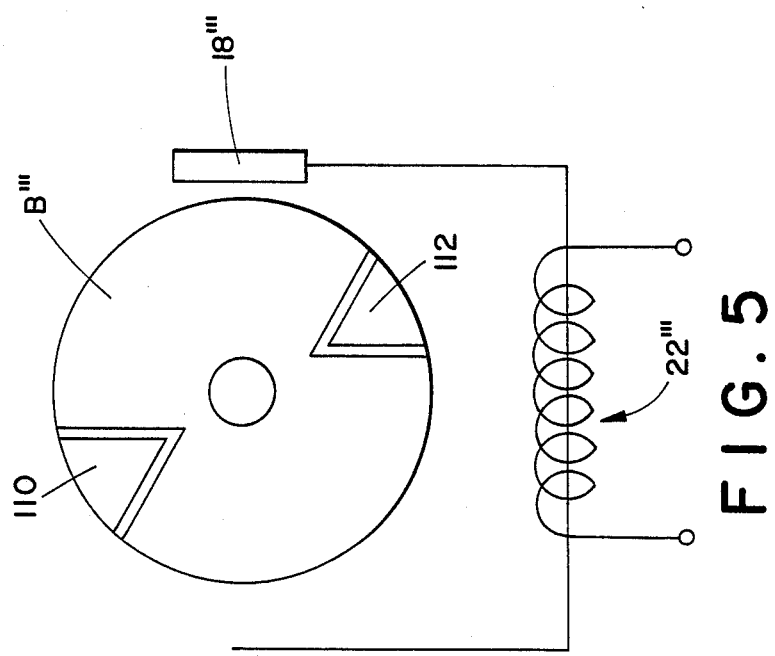

A third alternative embodiment is schematically illustrated in FIG. 5. Once again, for ease of illustration, like elements are identified by like numerals with a triple primed ("') suffix and new elements are identified by new numerals. In each of the previously described embodiments, the permanent magnet was mounted for rotational movement with the brush of the vacuum cleaner. The relative movement between the magnetic field and the stationary coil presented a changing magnetic flux that induced a current and provided a positive indication of brush rotation.

An alternative structure is shown in FIG. 5 in which the magnet and coil are both fixed to the nozzle housing in any conventional manner. The brush B'" is provided with pie-shaped metal portions 110, 112 which alter the magnetic field as these portions move toward and away from the magnet. This change in the magnetic field is apparent to the coil 22'", which once again, induces current flow therethrough. Thus, the magnet 18'" must be mounted in an area closely adjacent to the rotational path of the metal portions. Likewise, the coil 22'" must be closely mounted to the magnet so that the change in the magnetic field is detected in the coil.

Other electromagnetic or electrical means for providing a first signal comparable to the changing magnetic field may be employed. Light photons provided by a source of light energy can be considered equivalent to the magnetic flux. On the other hand, means for receiving this first signal and generating a second signal in response thereto may also be employed. In the embodiments described above, the coil structure was adapted to receive the first signal created by the magnetic flux and the coil. An induced current was advantageously generated in the coil in response to this changing magnetic field for powering a conventional LED. One skilled in the art will recognize that a photo-voltaic cell could just as easily perform this same type of function. The first signal provided by the light photons could be alternately interrupted by a rotating brush. The sequence of light pulses received by the photo-voltaic cell would establish an alternating current for an LED. If the brush failed to rotate or did not rotate at a sufficient speed, the LED would become dim or not be actuated at all.

The invention has been described with reference to the preferred and alternative embodiments. Obviously, modifications and alterations will occur to others upon a reading and understanding of this specification. The invention as described is intended to include all such modifications and alterations insofar as they come within the scope of the appended claims or the equivalents thereof.

Having thus described the invention, it is now claimed:

1. A vacuum cleaner comprising:
a housing enclosing a brush adapted for operative rotation therein;
a motor for rotatably driving said brush;
means for providing a first signal indicative of rotational movement of the brush, said first signal providing means including a metal element fixedly secured to said brush for rotation therewith and a magnet fixedly mounted to said housing whereby flux lines of said magnet are altered as said brush rotates; and,
means for receiving said first signal and for generating a second signal in response thereto.

2. The vacuum cleaner as defined in claim 1 wherein said means for receiving said first signal and for generating a second signal in response thereto is defined by a coil.

3. A vacuum cleaner comprising:
a nozzle housing;
a brush operatively received in said nozzle housing;
means for rotating said brush relative to said housing;
electromagnetic means for detecting rotary motion of said brush, said electromagnetic detecting means includes a coil mounted on said nozzle housing and an annular permanent magnet operatively disposed on said brush and adapted for rotary motion therewith, said annular magnet including alternating north and south poles circumferentially disposed thereon whereby rotational movement of said magnet relative to said coil induces a current therein; and,
means for indicating rotary motion of said brush, said indicating means actuated in response to the current induced in the coil.

4. The vacuum cleaner as defined in claim 3 wherein said indicating means includes a light.

* * * * *